(12) United States Patent
Kitamura et al.

(10) Patent No.: US 7,778,678 B2
(45) Date of Patent: Aug. 17, 2010

(54) RADIO CONTROL DEVICE

(75) Inventors: Nobuo Kitamura, Shiga (JP); Hikaru Fujiwara, Osaka (JP); Atsushi Murase, Osaka (JP)

(73) Assignee: Panasonic Corporation, Osaka (JP)

( * ) Notice: Subject to any disclaimer, the term of this patent is extended or adjusted under 35 U.S.C. 154(b) by 478 days.

(21) Appl. No.: 11/845,411

(22) Filed: Aug. 27, 2007

(65) Prior Publication Data
US 2008/0085736 A1    Apr. 10, 2008

(30) Foreign Application Priority Data
Oct. 10, 2006    (JP)    ............... 2006-276221

(51) Int. Cl.
*H04M 1/00* (2006.01)
(52) U.S. Cl. ............... 455/575.8; 455/550.1; 455/575.1
(58) Field of Classification Search ............. 455/575.7, 455/575.8, 550.1, 575.1, 575.5, 556.1, 556.2
See application file for complete search history.

(56) References Cited

U.S. PATENT DOCUMENTS 7,164,933 B1 * 1/2007 Steigerwald et al. ..... 455/562.1

| | | | |
|---|---|---|---|
| 2002/0094789 A1* | 7/2002 | Harano | 455/90 |
| 2003/0186728 A1* | 10/2003 | Manjo | 455/575.7 |
| 2007/0093219 A1* | 4/2007 | Nakasato et al. | 455/124 |
| 2007/0252823 A1* | 11/2007 | Hirota | 345/173 |
| 2007/0252827 A1* | 11/2007 | Hirota | 345/204 |

FOREIGN PATENT DOCUMENTS

| | | |
|---|---|---|
| JP | 2001-358514 A | 12/2001 |
| JP | 2001-358802 A | 12/2001 |
| JP | 2003-283393 A | 10/2003 |

* cited by examiner

*Primary Examiner*—Sonny Trinh
(74) *Attorney, Agent, or Firm*—RatnerPrestia (57) ABSTRACT

A tablet type computer for radio communication with other radio devices using two or more antennas in which, when sending radio waves, a radio communication control unit switches the antennas so that sending of radio signals is made using the antenna disposed at a position farthest from the operator or disposed at a position where the possibility of a part of the operator body coming in touch with the antenna is the lowest. With this operation, even a tablet type computer can keep away as much as possible a hand or a part of the body of the operator from the antenna which is a source of harmful electromagnetic waves.

9 Claims, 7 Drawing Sheets

RADIO CONTROL DEVICE

TECHNICAL FIELD

The present invention relates to a radio control device for switching radio communication antennas for portable information processing devices (herein after referred to as laptop computers) such as a laptop computer provided with a radio communication means.

BACKGROUND ART

In recent years, in view of portability of laptop computers, when accessing from a laptop computer to a network such as the Internet, it has become common to rely on network communication through radio communication such as wireless LAN which is convenient for moving around. Also, for connecting a laptop computer to external devices, radio data communication devices based on wireless LAN, Bluetooth, WWAN (wireless wide area network) are increasingly used when compared with those based on wired connection through USB or IEEE 1934.

Description of a conventional laptop computer will be given in the following.

Figure 6A:
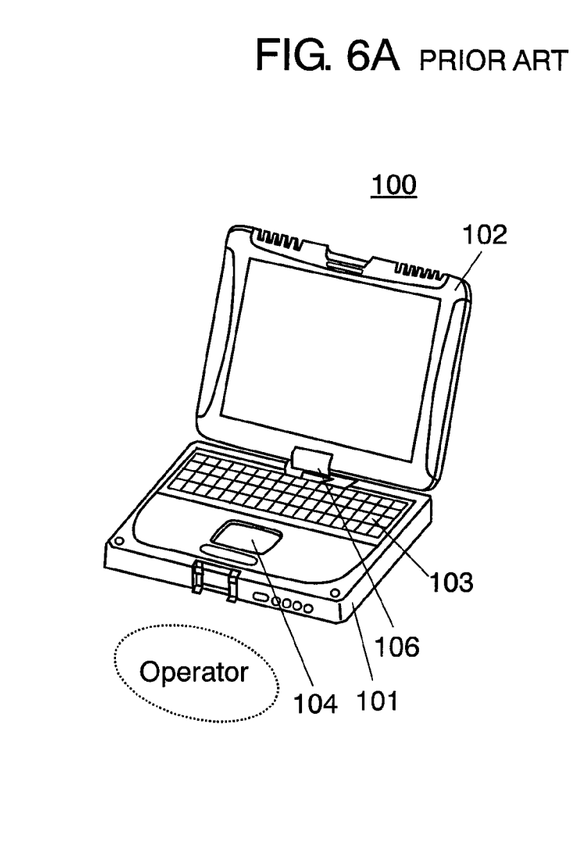
FIG. 6A is an appearance diagram of a conventional laptop computer.
Figure 6B:
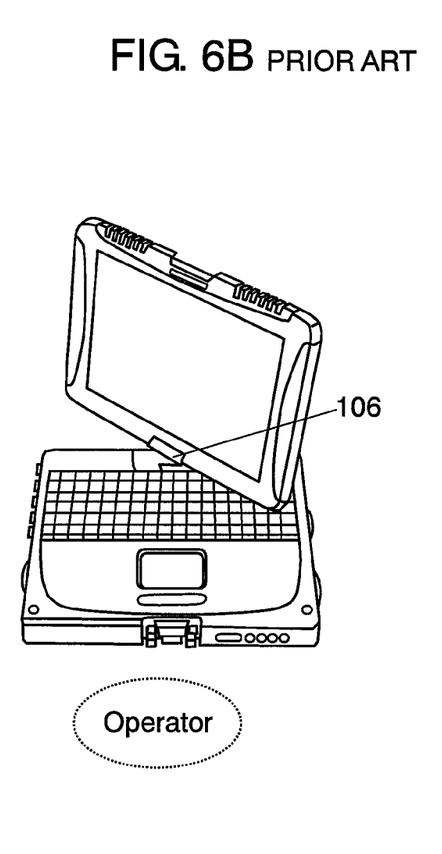
FIG. 6B is an appearance diagram of a conventional laptop computer.
Figure 6C:
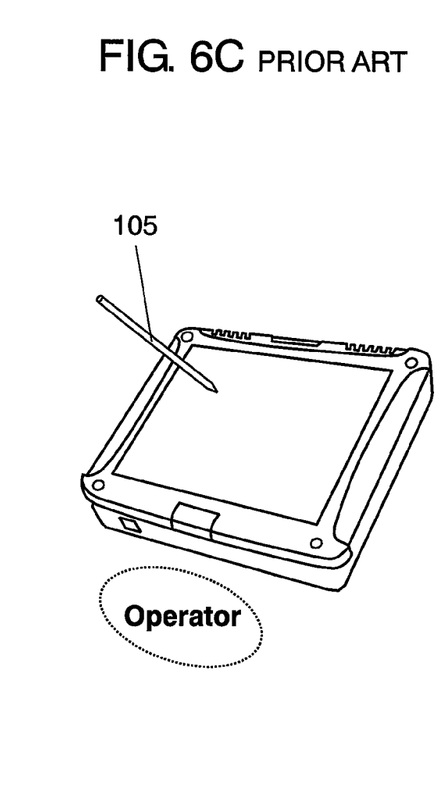
FIG. 6C is an appearance diagram of a conventional laptop computer.

FIG. 6A to FIG. 6C are appearance diagrams of a conventional laptop computer. In FIG. 6A, laptop computer 100 is composed of main body 101 and display 102 (such as LCD panel). And display 102 is provided with such function as a touch panel based on a pressure sensor or a digitizer. These functions perform a role equivalent to that of key board 103 and touch pad 104 as an input device. Here, as the inputting area specified by a dual-purpose display and touch panel is extremely narrow, it is more convenient to use ancillary thin pointed touch pen 105 as the inputting error is less.

Now, description of a conventional laptop computer configured as above will be given below.

As shown in FIG. 6A, a conventional laptop computer normally uses keyboard 103, mouse or touch pad 104 as an input device. Display 102 can not only be tilted backward and forward but it can also be turned by 180 degrees or more around axis of rotation 106 as shown in FIG. 6B. Accordingly, display 102 alone can be turned to a direction convenient to the user without moving main body 101 of the laptop computer. Furthermore, display 102 can be turned by 180 degrees around axis of rotation 106 and folded in a manner lapping over main body 101. As display 102 is equipped with a function of a touch panel, the laptop computer can be used as a tablet type computer as shown in FIG. 6C, and is superior in portability and high in convenience to the user.

Figure 7A:
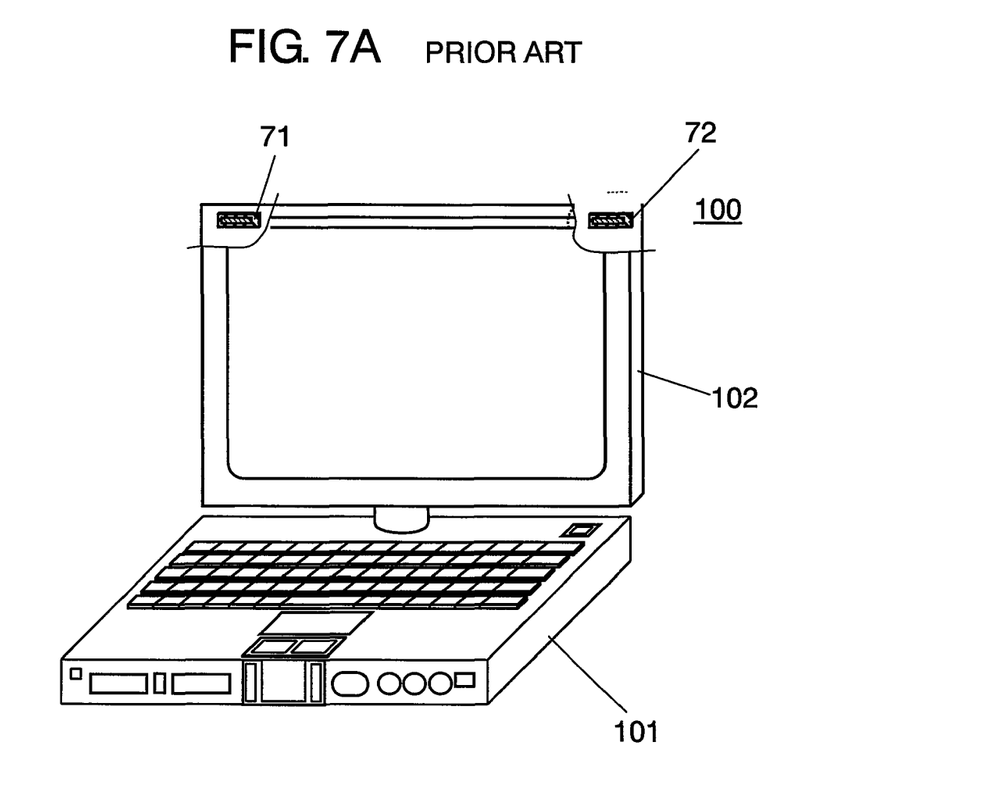
FIG. 7A is a diagram showing a conventional laptop computer and radio communication antennas.
Figure 7B:
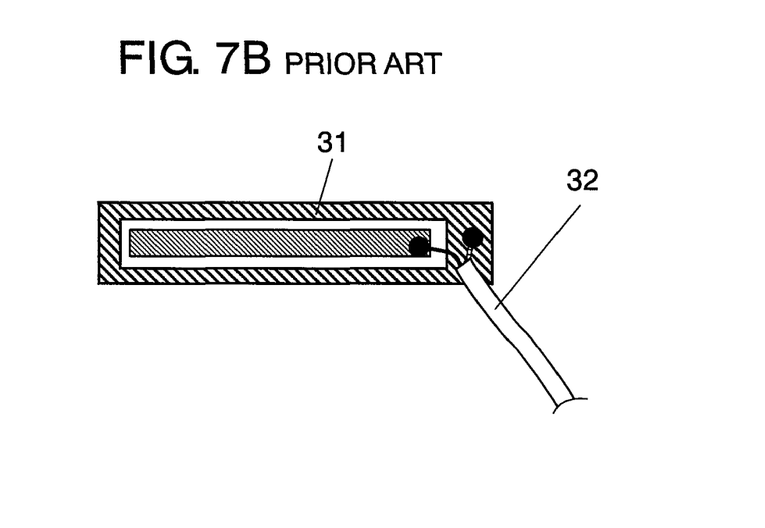
FIG. 7B is a diagram showing a conventional laptop computer and radio communication antennas.

FIG. 7A and FIG. 7B are diagrams showing a conventional laptop computer and radio communication antennas.

In FIG. 7A, laptop computer 100 is composed of laptop computer main body 101 and display 102 (such as LCD panel) as in FIG. 6A. Diversity antennas 71, 72 for radio communication are disposed at both ends of the upper part of display 102. Taking the effect of electromagnetic waves on the body of an operator of the laptop computer into consideration, care is taken to dispose antennas 71, 72 at locations as far away as possible from the operator.

As shown in FIG. 7B, diversity antennas 71, 72 for radio communication are simply composed of printed wiring board 31 prepared by printing copper foil on an insulator and cable 32 for transferring signals from a radio frequency signal sending section to a receiving section (not shown). In FIG. 7A, cabinet of the laptop computer is partially omitted. However, as the antennas are actually mounted inside the cabinet, they cannot be confirmed from outside. Here, diversity antenna is a system in which two or more antennas are connected and signal reception is made by switching as needed to the antenna with better reception. Accordingly, although two antennas 71, 72 are used in FIG. 7A, only one of them is used for actual reception.

For devices that generate electromagnetic waves, the value of specific absorption rate (SAR) is regulated. SAR value is a threshold determined based on scientific basis for preventing harmful effect of electromagnetic waves on human health. SAR value is a measure of absorption of electromagnetic waves by a living body and is referred to as "specific absorption ratio" or "local absorption ratio." SAR value represents the amount of electromagnetic energy absorbed by an arbitrary organ in a fixed time when a living body is exposed to electromagnetic waves. Permissible value of SAR is different from country to country. To clear the permissible value, it is critically important to keep away human body as much as possible from a source of electromagnetic waves or to keep from touching one.

When a laptop computer is used in the mode depicted in FIG. 6A, the antennas for radio communication are located at right and left ends of an upper part of display 102. Assuming that an operator will sit in front of laptop computer main body 101 (at the position encircled by a dotted line in FIG. 6A) facing display 102, these locations have been determined in order that the antennas will be at a distance from the operator as much as possible. That is, in consideration of the effect of electromagnetic waves on the body of the operator, these locations are determined to be as far away as possible from the operator of the laptop computer.

However, when using a laptop computer as a tablet type computer as shown in FIG. 6C, as main body 101 and display 102 are folded together, the operator will have to directly hold main body 101 and display 102 in one hand. As a result, there is a high possibility that the hand or body will touch a portion close to the radio communication antennas located at both ends of display 102.

Technical content of the above is disclosed in Japanese Unexamined Patent Application Publication No. 2001-358802, Japanese Unexamined Patent Application Publication No. 2001-358514, Japanese Unexamined Patent Application Publication No. 2003-283393, Japanese Unexamined Patent Application Publication No. 2003-163956, and Japanese Unexamined Patent Application Publication No. 2002-290544.

SUMMARY OF THE INVENTION

The present invention provides a radio control device for laptop computers that prevents as much as possible human body from coming close to or touching an antenna, being a source of electromagnetic waves, even in the case of a tablet type computer.

The radio control device in accordance with the present invention is a radio control device for portable information devices having radio communication capability for communication with other radio devices. It includes a radio communication module for sending and receiving signals to and from other radio devices, and a radio communication control unit for controlling radio wave send/receive and stopping of operation of the radio communication module and for switching to an optimum antenna out of plural antennas. In the radio communication control unit, switching between plural antennas is made when the radio communication module is sending so that the antenna located at a position farthest from the operator operating the portable information device or the antenna located at a position with least possibility of being touched by a part of the body of the operator is selected. Owing to such operation, it is possible to prevent as much as possible a hand or a part of the body of the computer operator from touching or getting closer to the antenna generating electromagnetic waves harmful to human body even in the case of a tablet type computer.

DETAILED DESCRIPTION OF PREFERRED EMBODIMENTS

Figure 1A:
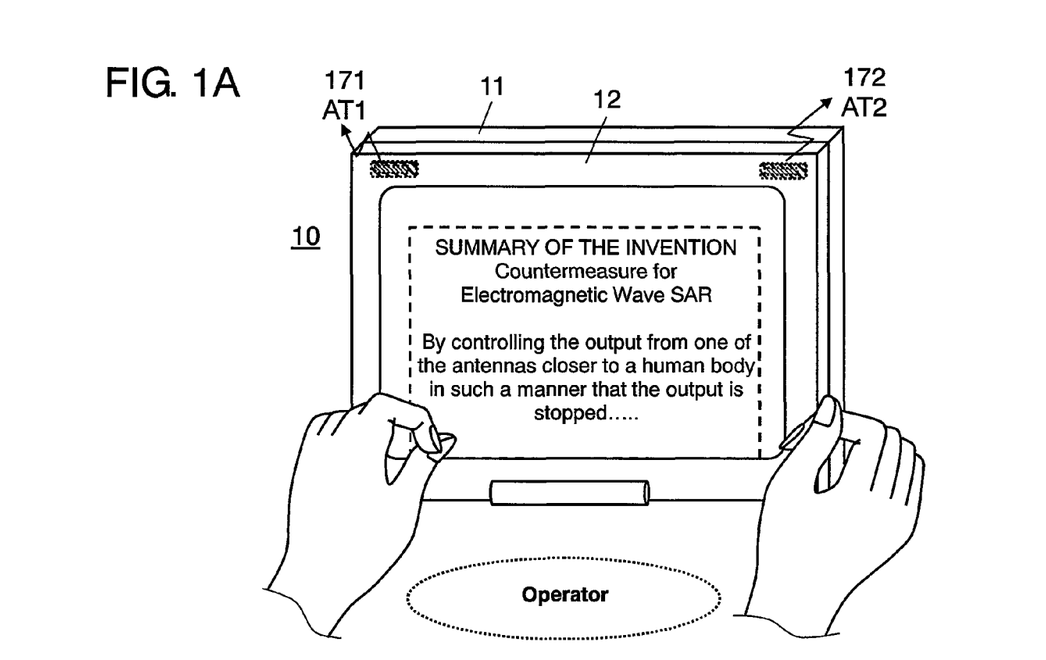
FIG. 1A is a diagram showing relationship between main body of a laptop computer as used in the mode of a tablet type computer in accordance with the present invention and sending from two antennas.
Figure 1B:
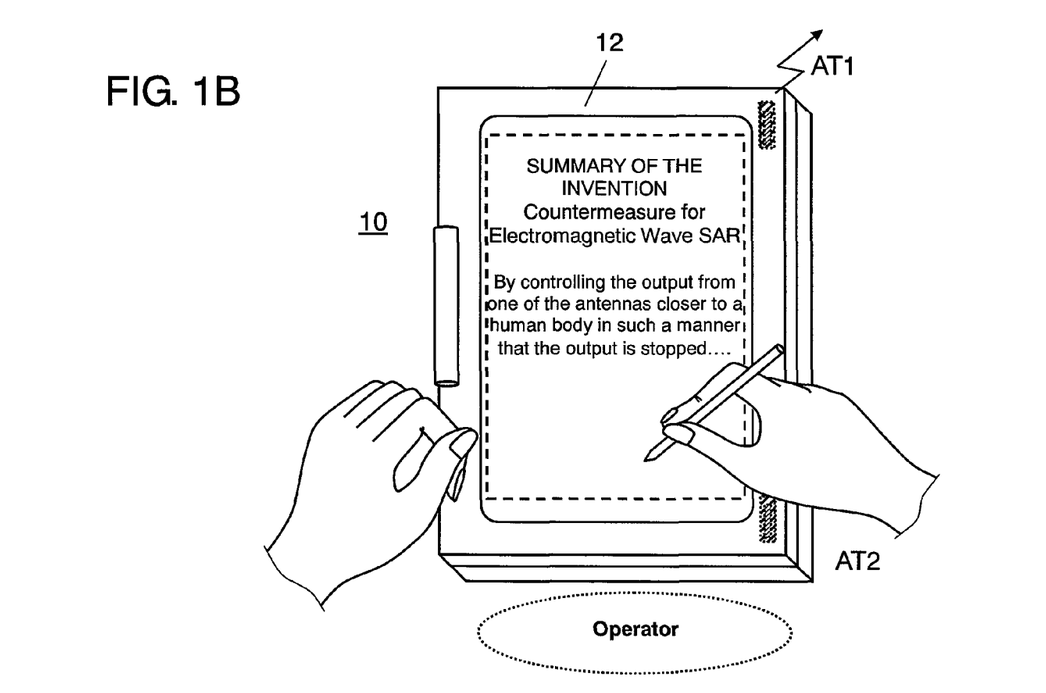
FIG. 1B is a diagram showing relationship between main body of a laptop computer as used in the mode of a tablet type computer in accordance with the present invention and sending from two antennas.
Figure 2:
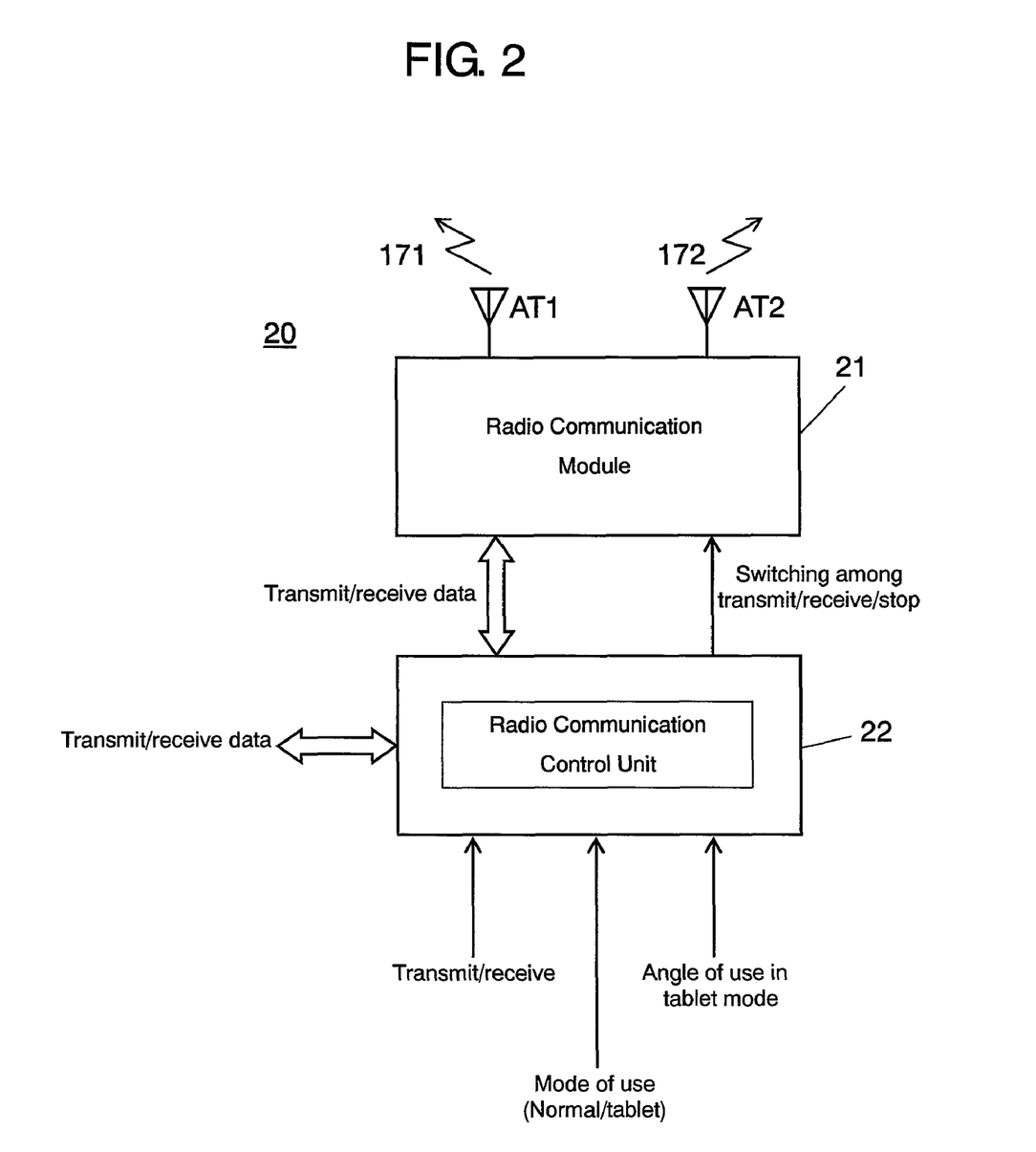
FIG. 2 is a configuration diagram of a radio control device for switching control of radio communication antennas.
Figure 3A:
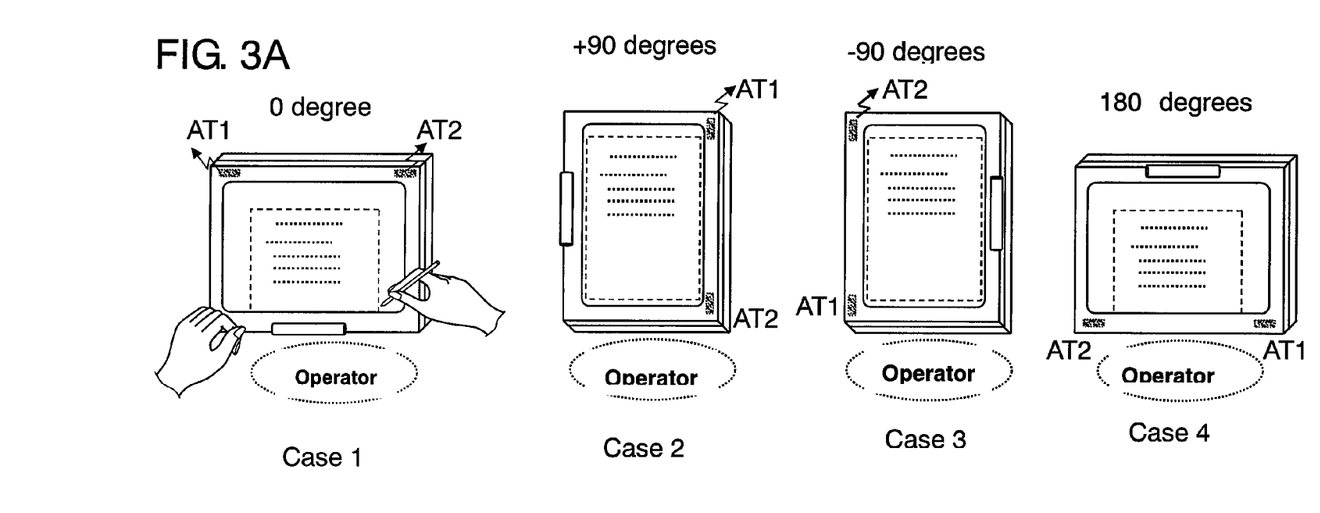
FIG. 3A is a diagram to illustrate switching control of radio communication antennas of the present invention at different angles when a laptop computer is used in the mode of a tablet type computer.
Figure 3B:
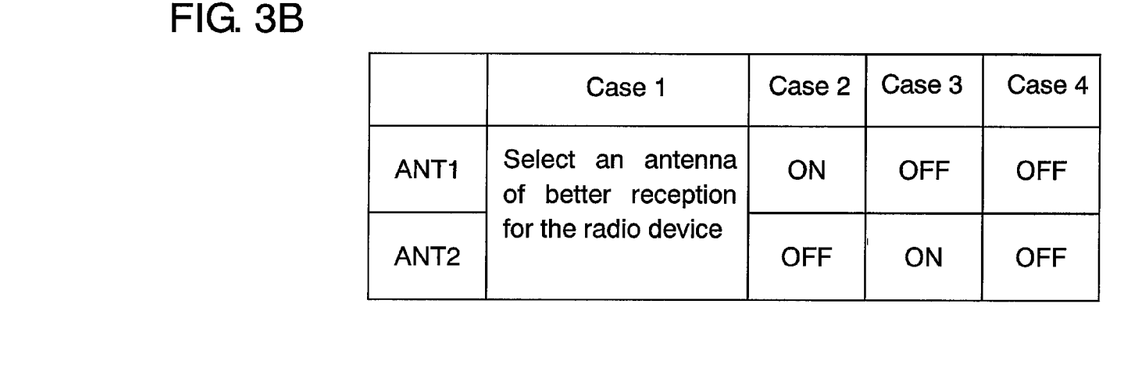
FIG. 3B is a diagram showing switching control of antennas during sending when a laptop computer is used in the mode of a tablet type computer.

Referring to FIG. 1 to FIG. 3, description of preferred embodiment of the present invention will be given in the following.

Preferred Embodiment 1

FIG. 1A and FIG. 1B are diagrams showing the relationship between a computer main body used as a tablet type computer and sending from two antennas in accordance with the present invention. In FIG. 1A and FIG. 1B, laptop computer 10 has laptop computer main body 11 and display 12 configured with a liquid crystal display panel and the like. When to use laptop computer 10 in the mode of a tablet type computer, display 12 is folded in a manner covering laptop computer main body 11.

Antenna 171 (hereinafter "AT1") and antenna 172 (hereinafter "AT2") are diversity antennas for radio communication and are disposed at both ends of the upper part of display 12 in FIG. 1A. In consideration of the effect of electromagnetic waves on the body of an operator, antennas AT1, AT2 are disposed as far away from the operator as possible.

Here, diversity antenna is a scheme of reception in which two or more antennas are connected and the one with better receiving condition is selected as needed by switching. Although two antennas are provided in FIG. 1A, only one of them is used in actual reception. Also, AT1, AT2 are disposed inside the housing of display 12 of a laptop computer.

FIG. 2 is a configuration diagram of a radio control device for switching control of radio communication antennas. The radio control device of the present invention is disposed inside laptop computer 10. In FIG. 2, radio control device 20 of the present invention includes radio communication module 21 and radio communication control unit 22. Radio communication module 21 sends and receives radio-frequency signals through antennas AT1, AT2. Radio communication control unit 22 transfers send data before modulation to and receive data after modulation from radio communication module 21. Also, when sending, receiving, or at rest, radio communication control unit 22 controls which of antennas AT1, AT2 to switch to in order that SAR value for the operator can be minimized when radio communication module 21 is in operation, at rest, or especially when sending.

Description of the operation of the radio control device as configured above will now be given.

In FIG. 1A, when to use laptop computer 10 in the mode of a tablet type computer in a transverse position, namely, with the long side of display 12 positioned in front of an operator, both of antennas AT1, AT2 for radio communication are at positions farthest from the operator and the possibility of directly touching the locations of the antennas is low. Accordingly, for such a laptop computer configuration, the SAR value is minimum in this case (hereinafter "Case 1").

The radio control device is so configured that, when receiving radio waves in Case 1, either of the antennas that shows better receiving condition by a device to communicate with will be switched. Accordingly, when sending radio waves, it is preferable to send using the antenna that shows better receiving condition by the wireless device to communicate with.

In FIG. 1B, when to use laptop computer 10 in the mode of a tablet type computer in the vertical direction, namely, with the short side of display 12 positioned in front of the operator, while AT1 is at a distance from the operator, AT2 is closer to the operator. Accordingly, in this case (hereinafter "Case 2"), in consideration of the allowable SAR value and effect of electromagnetic waves on human body, mandatory switching is made for sending from AT1 when to send radio waves.

When sending radio waves in Case 2, AT1 is used for the radio device to communicate with. Also, when receiving radio waves, switching is made to the antenna out of the two antennas with better reception from the radio device to communicate with as there is no sending of radio waves.

Also, as can be seen from FIG. 1A, FIG. 1B, a system is employed in which the direction of display 12 can be switched to a direction in which characters or images are easily viewable by the operator on display 12 of a laptop computer of Case 2 where laptop computer 10 of Case 1 has been turned clockwise by 90 degrees. The system may be switched by the discretion of the operator or may be automatically switched using an angle sensor.

In FIG. 2, radio communication control unit 22 controls sending, receiving, stopping of radio communication module 21 based on judgment of the mode of use (normal mode of use as a laptop computer and the mode of use as a tablet type computer), angle of use (Case 1, Case 2) when in the tablet type computer mode, and sending/receiving of radio signals.

Also, radio communication module 21 transfers send data before modulation when sending to and receive data after demodulation when receiving from other data processing block of laptop computer 10.

Furthermore, radio communication control unit 22 performs switching control between antennas AT1, AT2 in order to minimize SAR value to the operator based on the judgment of send/receive, normal/tablet type computer use mode, and angle of use when in the tablet type computer mode, and controls sending, receiving, and stopping.

FIG. 3A is a diagram to illustrate the switching control in accordance with the present invention of the radio communication antennas at different angles when a laptop computer is used in the mode of a tablet type computer.

In FIG. 3A, the mode of use is extended from the cases (Case 1, Case 2) of FIG. 1A, FIG. 1B to a mode (hereinafter "Case 3") in which the computer is turned counterclockwise by 90 degrees and 180 degrees (hereinafter "Case 4") from the position of Case 1.

In Case 3 of FIG. 3A, AT2 is at a distance from the operator while AT1 is in front of the operator. Accordingly, in Case 3, conversely to Case 1, forcible switching is made when sending radio waves to sending from AT2 in consideration of the permissible value of SAR and the effect of electromagnetic waves on human body.

In Case 4 of FIG. 3A, both AT1 and AT2 are positioned in front of the operator. Accordingly, when sending, emission of radio waves is stopped ("OFF") in the mode of use as a tablet type computer. In this Case 4, radio communication module is operated for receive only. Here, it is possible to make normal computer operation such as character inputting and image processing.

Also, it is also possible to restrict use of the computer in Case 4 by making it impossible, instead of stopping sending of radio waves, to change the direction of the display to a direction of easy viewing by the operator.

FIG. 3B is a diagram showing switching control of antennas when sending signals in the tablet type computer mode. When receiving, though an antenna with better receiving condition is selected by switching as needed, as the condition of radio wave reception generally gets worse when a human body comes closer to the antenna, the send antenna and the receive antenna are identical in Cases 1 and 3.

As stated above, according to the first preferred embodiment, it is possible to provide a radio control device that prevents as much as possible a hand or part of a body of the computer operator from coming close to or touching the antennas which are sources of electromagnetic waves harmful to human body even in the case of a tablet type computer.

Also, in FIG. 3A, though antennas are disposed at two locations at both ends of the upper part of display 12, they may also be located at both ends or in the middle between both ends of the lower part, or at four corners. By disposing at a central part between both ends or at four corners, sending of radio wave becomes possible even in Case 4.

Furthermore, in the case of a radio communication module in which only one antenna is used for sending, it may be possible to stop sending of radio waves when a human body comes close the antenna or to prevent use of the computer in a manner in which human body comes close to the antenna.

Figures 4A, 4B:
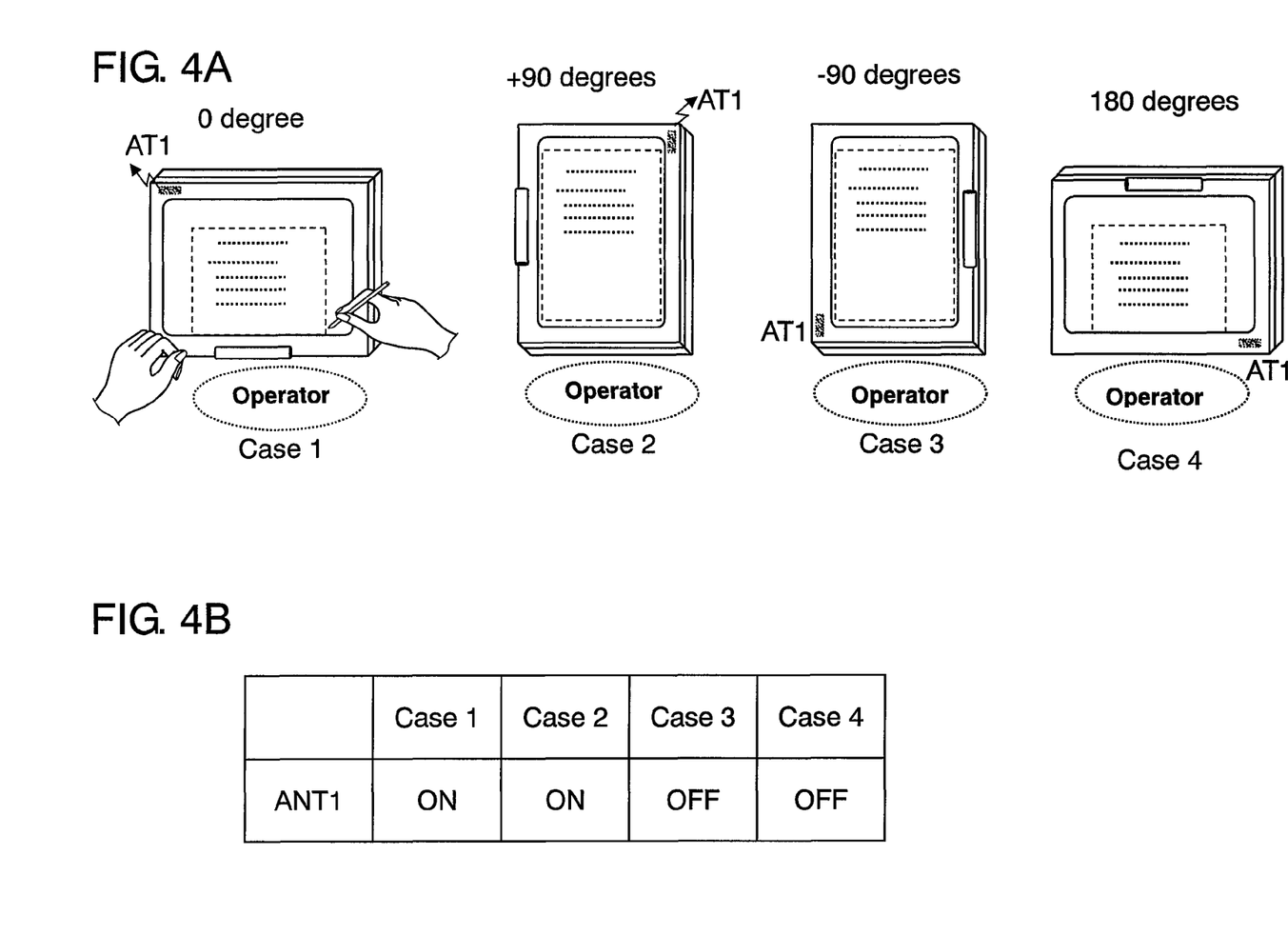
FIG. 4A is a diagram to illustrate switching control of radio communication antennas of the present invention at different angles when a laptop computer is used in the mode of a tablet type computer.
FIG. 4B is a diagram showing switching control of antennas during sending when a laptop computer is used in the mode of a tablet type computer.

FIG. 4A is a diagram to illustrate switching control of a radio communication antenna in accordance with the present invention when using a laptop computer having a single antenna AT1 in the mode of a tablet type computer at different angles. The difference from FIG. 3A is that only one antenna AT1 is mounted.

FIG. 4B is a diagram showing antenna switching control when sending in the mode of use as a tablet type computer. What is different from FIG. 3B is that sending from the antenna is stopped in Case 3 as in Case 4.

Figure 5A:
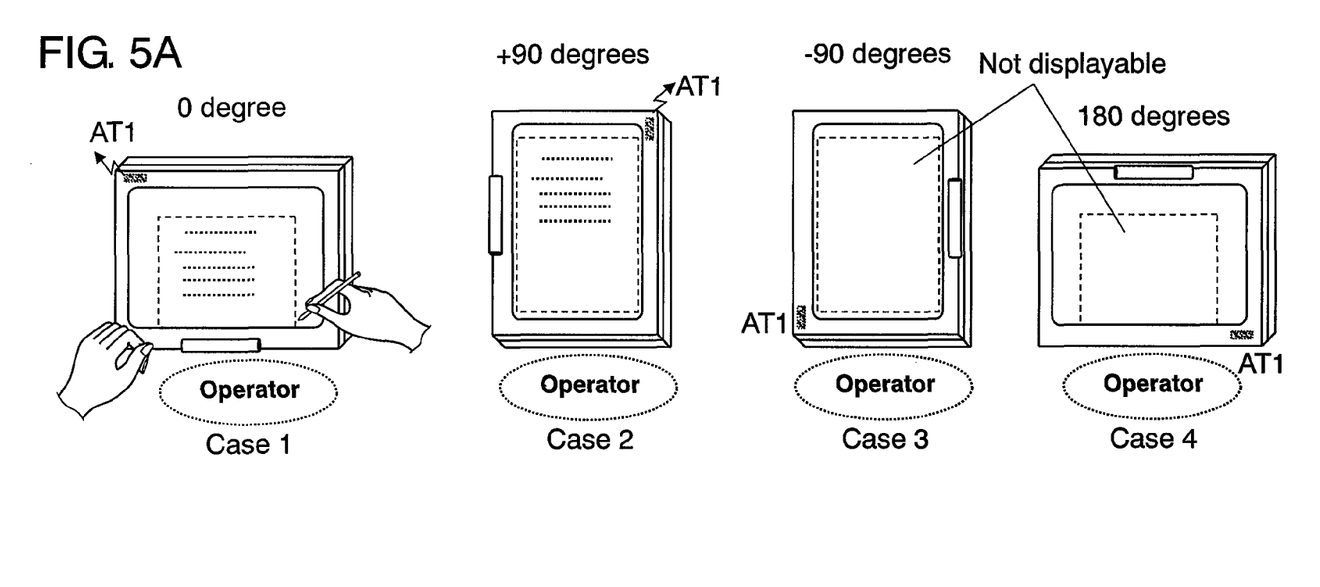
FIG. 5A is a diagram to illustrate permitted directions of display and prohibited directions of display when a laptop computer is used in the mode of a tablet type computer.
Figure 5B:
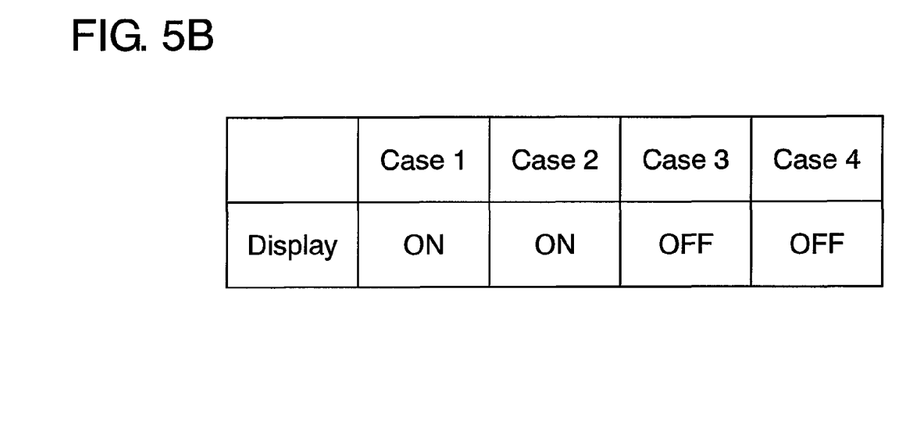
FIG. 5B is a diagram showing antenna states during sending when a laptop computer is used in the mode of a tablet type computer.

FIG. 5A is a diagram to illustrate restriction of displayable direction when a laptop computer having a single antenna of AT1 is used in the mode of a tablet type computer. FIG. 5B is a diagram showing switching control of the antenna when sending in the mode of use as a tablet type computer.

In FIG. 5A, it is only in the directions of 0 degree and 90 degrees that the display functions and no display can be made in the directions of −90 degrees and 180 degrees. Because of this, in the direction in which the antenna comes closer to the operator, no display is made thus preventing use of the computer in the direction in which antenna AT1 comes closer to the operator.

FIG. 5B is a diagram showing antenna states when sending in the mode of use as a tablet type computer. In FIG. 5B, while the display functions in Cases 1 and 2, the display stops functioning in Cases 3 and 4. By restricting displaying in the direction in which the antenna comes closer to a human body, antenna AT1 is made possible to send at all times. By doing in this way, use of the computer by the operator in Cases 3 and 4 can be restricted without sudden stoppage of sending of radio waves in the direction in which antenna AT1 comes closer to the operator.

The radio control device in accordance with the present invention prevents as much as possible a hand or a part of the body of a computer operator from coming close to or getting in touch with an antenna as a source of electromagnetic waves that are harmful to humans even in the case of a tablet type computer. Accordingly, the radio control device is useful for switching control of radio communication antennas of a portable information processing device that is capable of radio communication.

What is claimed is:

1. A radio control device for a portable information device having radio communication facility using more than one antenna for communication with other wireless devices, the radio control device comprising:

a radio communication module for sending and receiving radio signals with the other wireless devices; and a radio communication control unit for controlling sending and receiving of radio signals by and stopping of operation of the radio communication module, wherein the radio communication control unit transmits radio waves using one of the antennas that is disposed farthest from the operator of the portable information device; and wherein the portable information device is usable in the mode of a tablet type information device provided with a function of inputting into a rectangular display, or is provided with a function of inputting into a rectangular display and is usable as a tablet type portable information device by folding the display over a main body of the portable information device; and the more than one antenna is disposed inside a case at a corner of the display.

2. The radio control device of claim 1, wherein
the portable information device having a rectangular display is provided with direction-of-display conversion capability to change the direction of display to a direction of easy viewing by an operator whichever of the long side and the short side of the display may come in front of the operator; and
transmission of radio waves is enabled by switching the antennas disposed inside a case at corners of the display to the one disposed in the vicinity of a side of the display opposite the side closer to the operator.

3. The radio control device of claim 2, wherein the portable information device restricts the direction of the display from being changed to a direction of easy viewing by the operator thereby restricting use by the operator in the above direction instead of stopping transmission from an antenna disposed in the vicinity of a side of the display closer to the operator.

4. A radio control device for a portable information device having radio communication facility using single antenna for communication with other wireless devices, the radio control device comprising:
a radio communication module for sending and receiving radio signals with the other wireless devices; and
a radio communication control unit for controlling sending and receiving of radio signals by and stopping of operation of the radio communication module, wherein
the radio communication control unit stops transmission of radio waves when the single antenna comes closest to a part of the body of the operator operating the portable information device.

5. The radio control device of claim 4, wherein the portable information device further comprises a rectangular display and the single antenna is disposed in a case at a corner of the display.

6. The radio control device of claim 5, wherein
the portable information device having the display:
is provided with direction-of-display conversion capability to change the direction of display to a direction of easy viewing by the operator whichever of the long side and the short side of the display may come in front of the operator; and
stops transmission of radio waves when the single antenna is located on the side of the display that is closer to the operator.

7. A radio control device for a portable information device having radio communication facility using single antenna for communication with other wireless devices, the radio control device comprising:
a radio communication module for sending and receiving radio signals with the other wireless devices; and
a radio communication control unit for controlling sending and receiving of radio signals by and stopping of operation of the radio communication module, wherein
the radio communication control unit restricts manipulation in a direction in which the single antenna comes closest to a part of the body of the operator of the portable information device.

8. The radio control device of claim 7, wherein the portable information device further comprises a rectangular display and the single antenna is disposed in a case at a corner of the display.

9. The radio control device of claim 8, wherein the portable information device having the display:
is provided with direction-of-display converting capability to change the direction of display to a direction of easy viewing by the operator whichever of the long side and the short side of the display may come closer to the operator; and
restricts changing to a direction of easy viewing thus prohibiting use by the operator in that direction when there is the single antenna inside a side of the display closer to the operator.

* * * * *